US012044259B2

(12) United States Patent
Yu et al.

(10) Patent No.: US 12,044,259 B2
(45) Date of Patent: Jul. 23, 2024

(54) PIPING ASSEMBLY AND REFRIGERATION SYSTEM

(71) Applicant: Carrier Corporation, Palm Beach Gardens, FL (US)

(72) Inventors: Lei Yu, Shanghai (CN); Fujin Feng, Shanghai (CN); Yuchang Shao, Shanghai (CN); Xu Jiang, Shanghai (CN); Qunyi Ma, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 431 days.

(21) Appl. No.: 17/381,798

(22) Filed: Jul. 21, 2021

(65) Prior Publication Data

US 2022/0034338 A1 Feb. 3, 2022

(30) Foreign Application Priority Data

Jul. 31, 2020 (CN) ........................ 202010758307.3

(51) Int. Cl.
*F15D 1/04* (2006.01)
*F25B 41/40* (2021.01)

(52) U.S. Cl.
CPC ................ *F15D 1/04* (2013.01); *F25B 41/40* (2021.01)

(58) Field of Classification Search
CPC .... F16L 43/00; F15D 1/02; F15D 1/04; F15D 1/00; F15D 1/0005; F25B 41/40
(Continued)

(56) References Cited

U.S. PATENT DOCUMENTS 1,827,727 A * 10/1931 Blizard ..................... F15D 1/04 138/37
2,723,680 A * 11/1955 Danel ....................... F15D 1/04 138/116
(Continued)

FOREIGN PATENT DOCUMENTS

CN 1261427 A 7/2000
CN 1143995 C 3/2004
(Continued)

OTHER PUBLICATIONS

European Search Report for Application No. 21184772.8; Issued Dec. 12, 2021; 8 Pages.
(Continued)

*Primary Examiner* — Patrick F Brinson
(74) *Attorney, Agent, or Firm* — CANTOR COLBURN LLP

(57) ABSTRACT

A piping assembly and a refrigeration system. The piping assembly includes: an inlet portion extending along an inlet axis; an outlet portion extending along an outlet axis, wherein a predetermined angle is formed between the inlet axis and the outlet axis; a transition portion being attached between the inlet portion and the outlet portion and defining a transition axis; a cavity extending from the inlet portion to the outlet portion through the transition portion; and a first straightening portion including a plurality of deflector plates attached to an inner wall of the cavity, wherein the first straightening portion includes at least a first deflector plate and a second deflector plate connected at an angle, and the first deflector plate and the second deflector plate are configured to extend in parallel with a part of the outlet axis and a part of the transition axis.

11 Claims, 5 Drawing Sheets

(58) Field of Classification Search
USPC ........................................................ 137/37, 39
See application file for complete search history.

(56) References Cited

U.S. PATENT DOCUMENTS

| | | | | |
|---|---|---|---|---|
| 3,597,166 | A | 8/1971 | Man | |
| 4,362,223 | A | 12/1982 | Meier | |
| 4,471,821 | A * | 9/1984 | Coulon | F15D 1/08 422/220 |
| 4,802,342 | A | 2/1989 | Gustafson et al. | |
| 4,919,170 | A * | 4/1990 | Kallinich | F23J 11/00 428/410 |
| 5,687,768 | A * | 11/1997 | Mull, Jr. | F24F 13/081 137/561 A |
| 6,116,284 | A * | 9/2000 | Murray | A01C 15/04 406/87 |
| 6,279,334 | B1 | 8/2001 | Ishikawa et al. | |
| 7,142,424 | B2 | 11/2006 | Malone et al. | |
| 7,362,571 | B2 | 4/2008 | Kelley et al. | |
| 8,251,406 | B2 * | 8/2012 | Kawano | F15D 1/04 285/179 |
| 8,322,157 | B2 | 12/2012 | Petersen et al. | |
| 2004/0065375 | A1 | 4/2004 | Snider | |
| 2005/0247361 | A1 * | 11/2005 | Canova | F02M 35/10124 138/37 |
| 2009/0218000 | A1 * | 9/2009 | Pfau | F16L 55/02763 138/40 |
| 2012/0152394 | A1 * | 6/2012 | Yoskowitz | F15D 1/04 138/39 |
| 2018/0023589 | A1 | 1/2018 | Nakaniwa et al. | |
| 2018/0274831 | A1 | 9/2018 | Iancu et al. | |
| 2019/0390687 | A1 | 12/2019 | Koga et al. | |
| 2020/0378414 | A1 * | 12/2020 | Leutwyler | F15D 1/0025 |

FOREIGN PATENT DOCUMENTS

| | | | |
|---|---|---|---|
| CN | 1161581 | C | 8/2004 |
| CN | 100501277 | C | 6/2009 |
| CN | 102200141 | A | 9/2011 |
| CN | 101846461 | B | 10/2012 |
| CN | 101946091 | B | 1/2015 |
| CN | 105074354 | B | 12/2017 |
| CN | 109883085 | A | 6/2019 |
| JP | 2939396 | B2 | 8/1999 |
| JP | 2001147012 | A | 5/2001 |
| JP | 2005061778 | A | 3/2005 |
| JP | 4062011 | B2 | 1/2008 |
| JP | 2018013097 | A | 1/2018 |
| WO | 2019060754 | A2 | 3/2019 |

OTHER PUBLICATIONS

European Search Report for Application No. 21184772.8; Issued Nov. 12, 2023; 5 Pages.

* cited by examiner

PIPING ASSEMBLY AND REFRIGERATION SYSTEM

This application claims priority to Chinese Patent Application No. 202010758307.3, filed Jul. 31, 2020, and all the benefits accruing therefrom under 35 U.S.C. § 119, the contents of which in its entirety are herein incorporated by reference.

TECHNICAL FIELD

The present application relates to the field of refrigeration system structure. More specifically, the present application directs to a piping assembly that aims to provide improved fluid transfer. The present application also directs to a refrigeration system including the above piping assembly.

BACKGROUND

A refrigeration circuit is usually provided with piping for transferring working fluid. For example, the working fluid output from an evaporator will be supplied to a compressor, and the compressor may be a centrifugal compressor. The working fluid output from the evaporator usually has significant vortices and may include liquid components entrained in gaseous components. These vortices and liquid components will adversely affect the overall performance of the refrigeration circuit.

Therefore, there is a continuing need for new fluid transfer solutions. It is desired that the new solutions can at least alleviate the above problems to a certain extent.

SUMMARY OF THE INVENTION

An object of one aspect of the present application is to provide a piping assembly, which aims to improve the uniformity of working fluid and at least partially remove liquid components. Another object of the present application is to provide a refrigeration system including the above piping assembly.

The object of the present application is achieved through the following technical solutions.

A piping assembly is provided, which includes: an inlet portion extending along an inlet axis; an outlet portion extending along an outlet axis, wherein a predetermined angle is formed between the inlet axis and the outlet axis; a transition portion being attached between the inlet portion and the outlet portion and defining a transition axis; a cavity, which extends from the inlet portion to the outlet portion through the transition portion; and a first straightening portion including a plurality of deflector plates attached to an inner wall of the cavity, wherein the first straightening portion includes at least a first deflector plate and a second deflector plate connected at an angle, and the first deflector plate and the second deflector plate are configured to extend in parallel with a part of the outlet axis and a part of the transition axis.

In the above piping assembly, optionally, the first deflector plate and the second deflector plate are arranged to be perpendicular to each other, and rear edges of the first deflector plate and the second deflector plate that are closer to the outlet portion are arranged to be perpendicular to the outlet axis and/or the transition axis.

In the above piping assembly, optionally, a second straightening portion is further included, the second straightening portion is arranged upstream and/or downstream of the first straightening portion, and includes a plurality of third deflector plates attached to the inner wall of the cavity.

In the above piping assembly, optionally, the second straightening portion and the first straightening portion are configured to be spaced apart from each other.

In the above piping assembly, optionally, both ends of each of the third deflector plates are respectively attached to the inner wall of the cavity.

In the above piping assembly, optionally, the third deflector plates are configured to be parallel with each other and extend in parallel with a part of the transition axis.

In the above piping assembly, optionally, the rear edge of each of the third deflector plates that is closer to the outlet portion is arranged to be perpendicular to the transition axis and/or the outlet axis.

In the above piping assembly, optionally, the first straightening portion is made of a porous material, and the second straightening portion is made of a porous material.

In the above piping assembly, optionally, the predetermined angle is configured to be between 45 degrees and 135 degrees.

A refrigeration system is provided, which includes: a refrigeration circuit including an evaporator and a compressor; and the piping assembly as described above, wherein the inlet portion is attached to an outlet end of the evaporator, and the outlet portion is attached to an inlet end of the compressor.

In the above refrigeration system, optionally, the piping assembly is arranged such that the inlet axis is oriented substantially vertical and the outlet axis is oriented substantially horizontal.

The piping assembly and the refrigeration system of the present application have the advantages of being simple and reliable, being easy to implement, and being convenient to use. The uniformity of the working fluid of the refrigeration system is significantly improved, and the content of liquid components is reduced.

BRIEF DESCRIPTION OF THE DRAWINGS

The present application will be described below in further detail with reference to the accompanying drawings and preferred embodiments. Those skilled in the art will appreciate that these drawings are drawn only for the purpose of explaining the preferred embodiments and should not be construed as limiting the scope of the present application. In addition, unless specifically stated, the drawings are only intended to conceptually represent the composition or construction of the described objects and may contain exaggerated illustration. The drawings are not necessarily drawn to scale.

DETAILED DESCRIPTION

Figure 1:
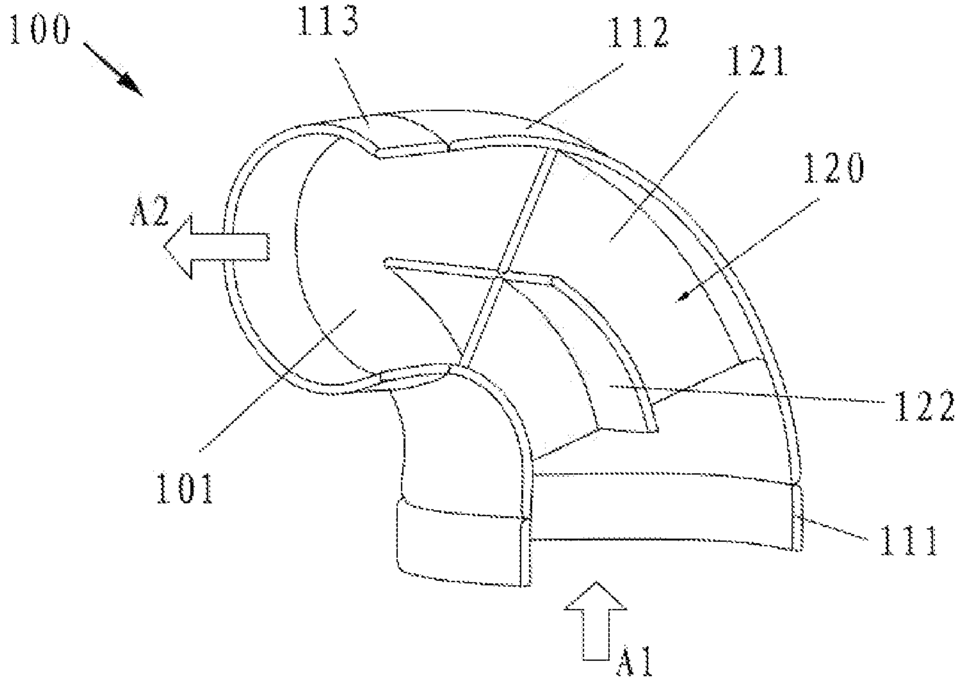
FIG. 1 is a partial cross-sectional perspective view of a piping assembly according to an embodiment of the present application.

Hereinafter, preferred embodiments of the present application will be described in detail with reference to the accompanying drawings. Those skilled in the art will appreciate that these descriptions are merely illustrative and exemplary, and should not be construed as limiting the scope of protection of the present application.

Firstly, it should be noted that the orientational terms such as top, bottom, upward, and downward mentioned herein are defined with respect to the directions in various drawings. These directions are relative concepts, and therefore will vary with the position and state thereof. Accordingly, these or other orientational terms should not be interpreted as restrictive.

In addition, it should also be noted that for any single technical feature described or implied in the embodiments herein, or any single technical feature shown or implied in the drawings, it is still possible to combine these technical features (or their equivalents) so as to obtain other embodiments that are not directly mentioned herein.

It should be noted that in different drawings, identical or substantially identical components are denoted by identical reference signs.

FIG. 1 is a partial cross-sectional perspective view of a piping assembly according to an embodiment of the present application. The piping assembly 100 includes an inlet portion 111, a transition portion 112, and an outlet portion 113 extending in sequence. The inlet portion 111 may be configured to extend along an inlet axis, the transition portion 112 may be configured to extend along a transition axis, and the outlet portion 113 may be configured to extend along an outlet axis. In the illustrated embodiment, the inlet axis may be substantially parallel with an arrow A1, the outlet axis may be substantially parallel with the arrow A2, and both ends of the transition axis are tangent to the outlet axis and the inlet axis respectively, so as to provide smooth transition between the inlet axis and the outlet axis. According to actual needs, the inlet axis and the outlet axis may be respectively positioned in predetermined directions so as to form a predetermined angle therebetween. In an embodiment, the predetermined angle is between 45 degrees and 135 degrees. In the illustrated embodiment, the predetermined angle may be approximately 90 degrees.

The inlet portion 111, the transition portion 112 and the outlet portion 113 may jointly surround a cavity 101. The edges of the cavity 101 may be defined by the inner walls of the inlet portion 111, the transition portion 112 and the outlet portion 113 and provide fluid communication from the inlet portion 111 to the outlet portion 113. In this disclosure, the inner wall of the cavity 101 refers to the inner wall of one or more of the inlet portion 111, the transition portion 112 and the outlet portion 113. In addition, the wall thicknesses of the inlet portion 111, the transition portion 112 and the outlet portion 113 may be substantially the same, or gradually varying wall thicknesses may be provided according to actual needs. The inlet portion 111, the transition portion 112 and the outlet portion 113 may be configured in one piece, or may be manufactured separately and then assembled together.

The inlet portion 111, the transition portion 112 and the outlet portion 113 may be configured to have a substantially circular, elliptical or other curvilinear cross section, and the size of the cross section may vary along the inlet axis, the transition axis, and the outlet axis. In an embodiment, the circular cross section of the inlet portion 111 has a first diameter, the circular cross section of the outlet portion 113 has a second diameter, and the first diameter is larger than the second diameter. The circular cross section of the transition portion 112 may gradually change from the first diameter to the second diameter.

The piping assembly 100 further includes a first straightening portion 120. The first straightening portion 120 includes a plurality of deflector plates attached to the inner wall of the cavity 101. In the illustrated embodiment, the first straightening portion 120 includes a first deflector plate 121 and a second deflector plate 122 connected perpendicular to each other. According to actual needs, the first straightening portion 120 may further include one or more deflector plates parallel with the first deflector plate 121, and one or more deflector plates parallel with the second deflector plate 122. In an embodiment, the first deflector plate 121 and the second deflector plate 122 extend in parallel with a part of the outlet axis and a part of the transition axis. In an embodiment, the first deflector plate 121 and the second deflector plate 122 extend in parallel with a part of the transition axis. In the illustrated embodiment, for the sake of clarity, only the parts of the first deflector plate 121 and the second deflector plate 122 that are parallel with a part of the transition axis are shown. Those skilled in the art can easily understand that the first deflector plate 121 and the second deflector plate 122 may also have other shapes and positions that are not shown.

The first deflector plate 121 and the second deflector plate 122 may be arranged to form a predetermined angle relative to each other. For example, the first deflector plate 121 and the second deflector plate 122 may be configured to be perpendicular to each other, or may be angled relative to each other. The first deflector plate 121 and the second deflector plate 122 may be arranged along the diameter of the circular cross section of the piping assembly 100 as shown in the figure, and pass through the center of the circle of the circular cross section. The first deflector plate 121 and the second deflector plate 122 may also be arranged to deviate from the center of the circle, or have other asymmetrical patterns of arrangement.

The first deflector plate 121 and the second deflector plate 122 include a front edge closer to the inlet portion 111 and a rear edge closer to the outlet portion 113. The front edges of the first deflector plate 121 and the second deflector plate 122 may be located in a certain cross section within the transition portion 112, and the rear edges of the first deflector plate 121 and the second deflector plate 122 may be located in a certain cross section within the outlet portion 113. In an embodiment, the rear edges of the first deflector plate 121 and the second deflector plate 122 are arranged perpendicular to the outlet axis, and are located in the same cross section of the outlet portion 113, as shown schematically below with reference to FIG. 5. The rear edges of the first deflector plate 121 and the second deflector plate 122 may also be arranged perpendicular to the transition axis, and are located in the same cross section of the transition portion 112. In an embodiment, the front edges of the first deflector plate 121 and the second deflector plate 122 may be arranged perpendicular to the transition axis, or may form a certain angle with the transition axis, and the front edges of the first deflector plate 121 and the second deflector plate 122 may be arranged in the same cross section of the transition portion 112.

The front edges and rear edges referred to herein are defined relative to a flow direction of working fluid. For example, in the embodiment shown in FIG. 1, the front edge is an end of the deflector plate that is located at an upstream position of a flow path of the working fluid, and the rear edge is an end of the deflector plate that is located at a downstream position of the flow path of the working fluid.

Therefore, the front edge of each deflector plate is closer to the inlet portion, and the rear edge of each deflector plate is closer to the outlet portion.

During use, the working fluid enters the piping assembly 100 from the inlet portion 111 substantially in a direction indicated by the arrow A1. The working fluid may contain vortices in random directions and liquid components entrained therein. When the working fluid travels to the first straightening portion 120, the first deflector plate 121 and the second deflector plate 122 will at least partially destroy the vortices in the working fluid, so that the working fluid at least partially tends to change into fluid having parallel flow paths along the transition axis or the outlet axis, so that the fluid leaving the outlet portion 113 travels along the parallel flow paths. In addition, the liquid components in the working fluid can be at least partially captured by the first straightening portion 120, so that the liquid components are blocked or adsorbed at the first straightening portion 120 and are at least partially prevented from exiting through the outlet portion 113. In addition, in case that the piping assembly 100 is installed in the direction shown in FIG. 1, the inlet axis is substantially arranged in the vertical direction, and at least a part of the first straightening portion 120 faces the inlet portion 111 in the vertical direction. Therefore, the blocked or adsorbed liquid components may drip under the action of gravity and leave the piping assembly 100 from the inlet portion 111.

The vertical direction referred to herein refers to a direction in which gravity acts, and a horizontal direction referred to herein refers to a direction in which a horizontal plane is located. Typically, the horizontal direction and the vertical direction are perpendicular to each other.

The first straightening portion 120 may be made of a porous material to improve the ability of capturing the liquid components. The first straightening portion 120 may also be made of a common material that does not contain pores. Porous materials include but are not limited to foaming alloys and so on. The first deflector plate 121 and the second deflector plate 122 may have substantially uniform thickness, and may also be configured to have different thicknesses or varying thicknesses.

Figure 2:
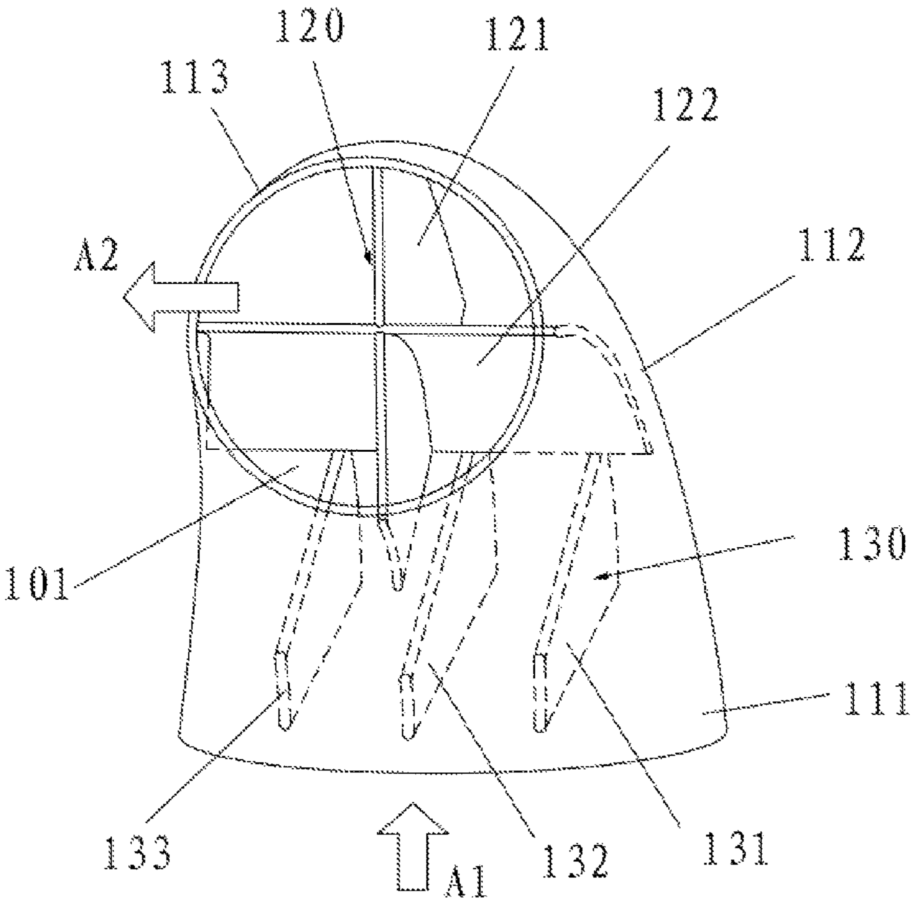
FIG. 2 is a schematic perspective view of a piping assembly according to another embodiment of the present application.

FIGS. 2 to 5 show another embodiment of the piping assembly of the present application. FIG. 2 schematically shows components that cannot be directly observed from the outside of the piping assembly 100 with dashed lines. In the embodiment in FIG. 2, a second straightening portion 130 is added on the basis of the embodiment in FIG. 1. As shown in the figures, the second straightening portion 130 includes a plurality of third deflector plates 131, 132 and 133 provided upstream of the first straightening portion 120. Both ends of the third deflector plates 131, 132 and 133 may be attached to the inner wall of the cavity 101. In addition, the third deflector plates may also be attached to a component located upstream of the inlet portion 111, and extend into the inlet portion 111 or extend into the transition portion 112 through the inlet portion 111. Each of the third deflector plates 131, 132 and 133 may be configured to be parallel with each other, and may be configured to be equally or non-equally spaced apart.

The second straightening portion 130 in the illustrated embodiment includes three third deflector plates. According to actual needs, more or fewer third deflector plates may be provided at the second straightening portion 130.

In the illustrated embodiment, the second straightening portion 130 is located upstream of the first straightening portion 120. However, according to actual needs, the second straightening portion may also be arranged downstream of the first straightening portion, or second straightening portions may be arranged at both upstream and downstream of the first straightening portion respectively.

Figure 5:
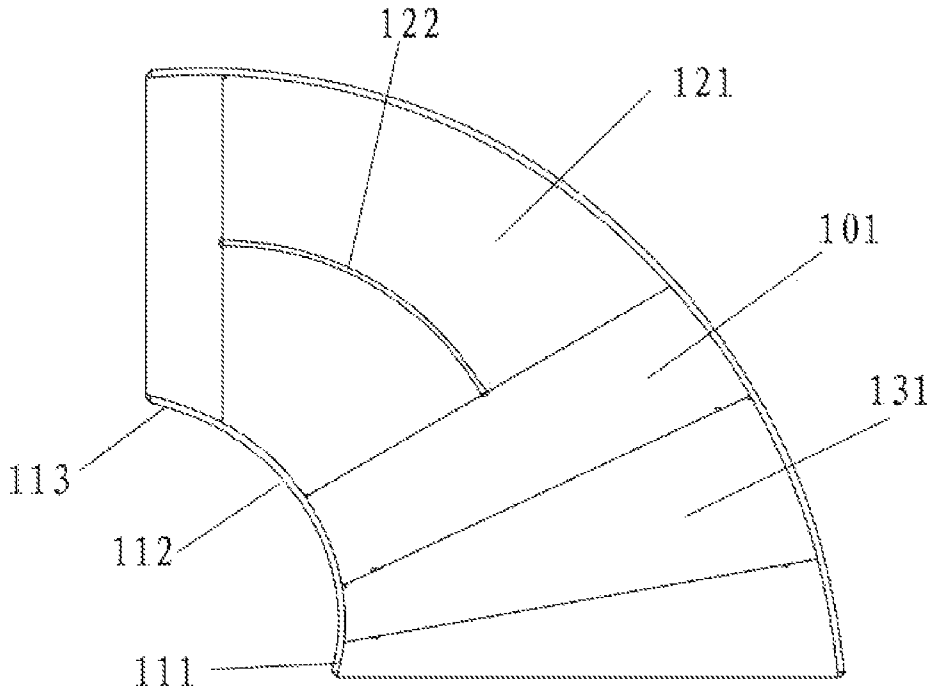
FIG. 5 is a cross-sectional view of the embodiment shown in FIG. 2.

Each of the third deflector plates 131, 132 and 133 may extend in parallel with a part of the transition axis. The third deflector plates 131, 132 and 133 may each have a front edge closer to the inlet portion 111 and a rear edge closer to the outlet portion 113. As shown in FIG. 5, in an embodiment, the rear edge of each of the third deflector plates may be arranged perpendicular to the transition axis, and may be located in the same cross section of the transition portion. In another embodiment, the front edge of each of the third deflector plates may also be arranged perpendicular to the transition axis, and may be located in the same cross section of the transition portion. In addition, the front edge of each of the third deflector plates may also be arranged to form a certain angle with the transition axis. In case that the second straightening portion is arranged upstream of the first straightening portion, the rear edges of the third deflector plates may also be arranged perpendicular to the outlet axis and may be located in the same cross section of the outlet portion.

Figure 3:
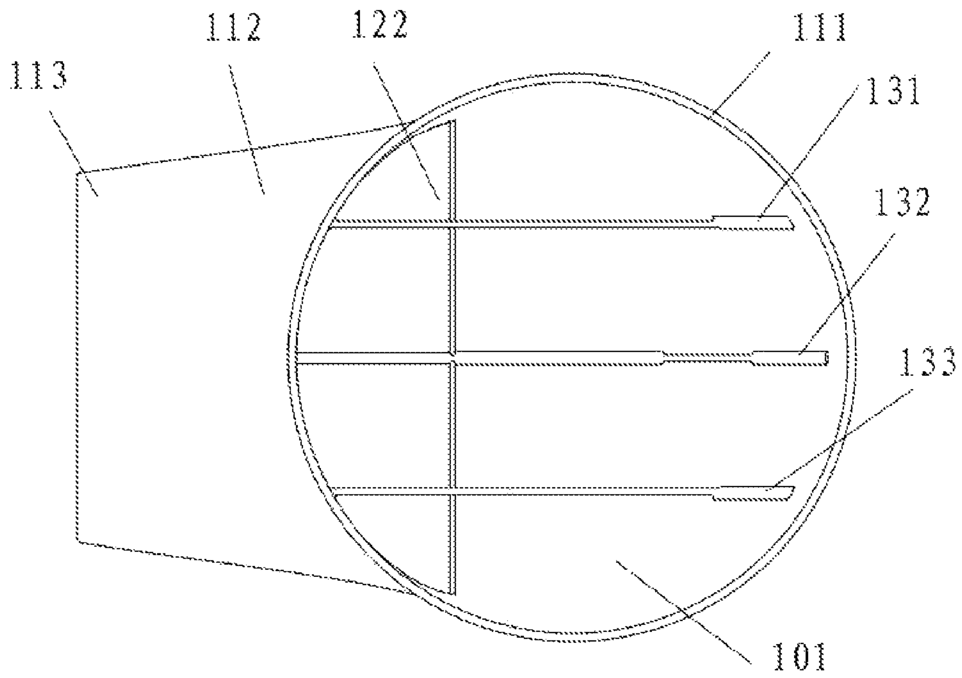
FIG. 3 is a view of the embodiment shown in FIG. 2 seen in a direction from the inlet portion.
Figure 4:
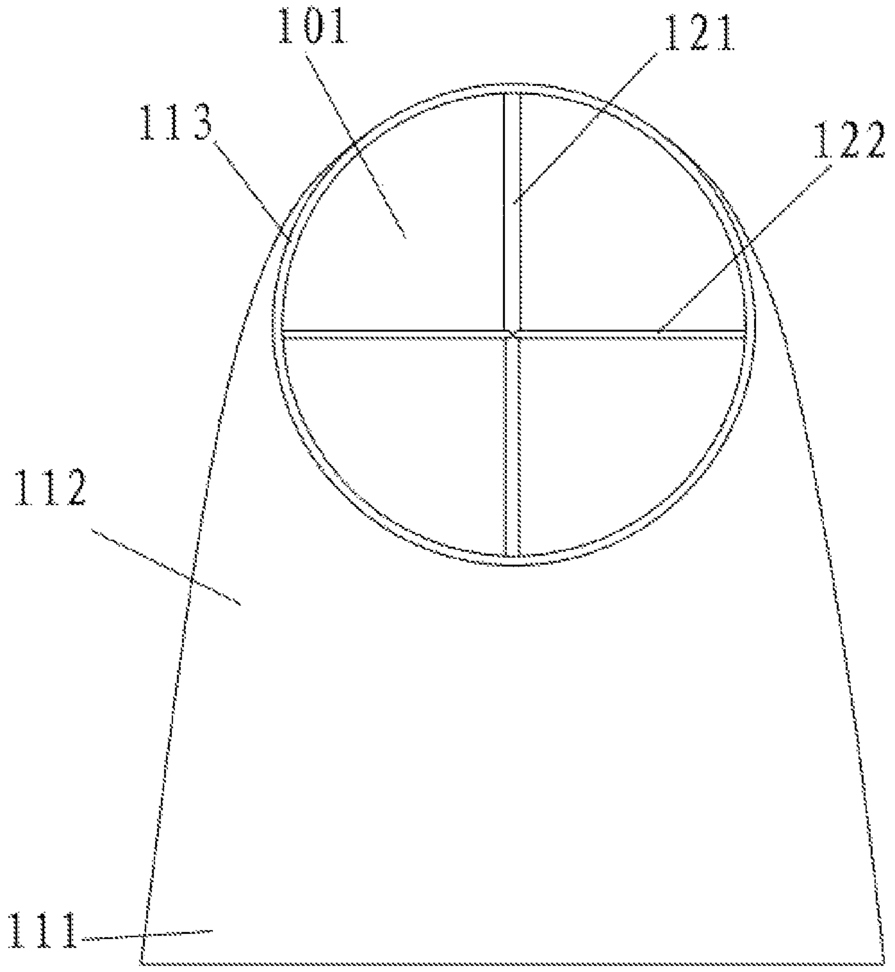
FIG. 4 is a view of the embodiment shown in FIG. 2 seen in a direction from the outlet portion.

As shown in the figures, each of the third deflector plates may be configured to be substantially parallel with the first deflector plate 121, or may be configured to be substantially parallel with the front edge of one of the first deflector plate and the second deflector plate, so as to initially provide the desired fluid guiding function. As shown in FIG. 3, the third deflector plate 132 substantially shields the first deflector plate 121, and at least a part of the first straightening portion 120 is visible at the inlet portion 111. As shown in FIG. 4, when seen from the outlet portion 113, the rear edges of the first deflector plate 121 and the second deflector plate 122 that are arranged perpendicular to each other are visible, and the second straightening portion 130 is invisible. In addition, each of the third deflector plates may have substantially the same wall thickness, or may have different wall thicknesses or varying wall thicknesses according to actual needs.

During use, the working fluid inflows from the inlet portion 111 and is initially straightened by the second straightening portion 130. The arrangement of the third deflector plates is advantageous for initially destroying the vortices, so as to provide parallel flow paths of the working fluid. The second straightening portion 130 may also at least partially capture the liquid components in the working fluid, and enables the liquid components to drip from the second straightening portion 130 under the action of gravity and leave the piping assembly 100 through the inlet portion 111.

Similarly, the second straightening portion 130 may also be made of a porous material to improve the ability of capturing the liquid components. The second straightening portion 130 may also be made of a common material that does not contain pores. Porous materials include but are not limited to foaming alloys and so on. The second straightening portion 130 may be made of the same material as the first straightening portion 120, or may be made of a different material from the first straightening portion 120.

During manufacturing, the first straightening portion 120 and the second straightening portion 130 may be manufactured separately and then attached within the piping assembly 100. The attachment method may be bonding, bolting, welding and other connecting means. The first straightening portion 120 and/or the second straightening portion 130 may also be configured to be integral with the inlet portion 111, the transition portion 112 and the outlet portion 113, and they may be manufactured integrally.

The present application also provides a refrigeration system. The refrigeration system may include an evaporator and a compressor connected in series in a refrigeration circuit. The piping assembly described above may be attached between the evaporator and the compressor. For example, the inlet portion 111 of the piping assembly 100 may be attached to an outlet end of the evaporator not shown, and the outlet portion 113 of the piping assembly 100 may be attached to an inlet end of the compressor not shown. The refrigeration circuit may be appropriately oriented such that the piping assembly 100 is arranged in such a way that the inlet axis is substantially oriented in the vertical direction, and/or the outlet axis is substantially oriented in the horizontal direction.

It is easy to understand that the refrigeration circuit may further include components such as a condenser, a directional valve, and so on.

During use, the working fluid output from the evaporator may have undesired vortices and liquid components, and the flow paths of the working fluid are random and interlaced with each other. The working fluid enters the piping assembly 100 through the inlet portion 111 and is straightened by the first straightening portion 120 or by both the first straightening portion 120 and the second straightening portion 130. In this process, the vortices in the working fluid are at least partially eliminated, and the working fluid leaving the piping assembly 100 from the outlet portion 113 tends to have flow paths that are substantially parallel with each other. In addition, the liquid components entrained in the working fluid may also be at least partially captured by the first straightening portion 120 and the second straightening portion 130, and the working fluid leaving the outlet portion 130 tends to have fewer liquid components.

In addition, the piping assembly of the present application is not limited to the usage disclosed above, but may be installed at any suitable position in the refrigeration circuit, while still capable of providing improved parallelism, uniformity and liquid entrainment degree of the working fluid.

By adopting the piping assembly and refrigeration system of the present application, the parallelism of the working fluid in the refrigeration circuit can be effectively improved, and undesired liquid components can be reduced, thereby effectively improving the overall efficiency of the refrigeration circuit. In an embodiment, the refrigeration system adopting the piping assembly of the present application can achieve a performance improvement of 1%-3%.

The present application has been disclosed herein with reference to the accompanying drawings, and enabled those skilled in the art to implement the present application, including manufacturing and using any device or system, selecting suitable materials, and using any combined method. The scope of the present application is defined by the claimed technical solutions, and contains other examples that can be conceived by those skilled in the art. Such other examples should be considered as falling within the scope of protection determined by the technical solutions claimed in the present application, as long as such other examples include structural elements that are not different from the literal language of the claimed technical solutions, or such other examples include equivalent structural elements that are not substantively different from the literal language of the claimed technical solutions.

What is claimed is:

1. A piping assembly comprising:

an inlet portion extending along an inlet axis;

an outlet portion extending along an outlet axis, wherein a predetermined angle is formed between the inlet axis and the outlet axis;

a transition portion being attached between the inlet portion and the outlet portion and defining a transition axis;

a cavity extending from the inlet portion to the outlet portion through the transition portion; and a first straightening portion comprising a plurality of deflector plates attached to an inner wall of the cavity, wherein the first straightening portion comprises at least a first deflector plate and a second deflector plate connected at an angle, the first deflector plate and the second deflector plate are configured to extend in parallel with a part of the outlet axis and a part of the transition axis;

further comprising a second straightening portion being arranged upstream of the first straightening portion, and the second straightening portion comprises a plurality of third deflector plates attached to the inner wall of the cavity.

2. The piping assembly according to claim 1, wherein the first deflector plate and the second deflector plate are arranged to be perpendicular to each other, and rear edges of the first deflector plate and the second deflector plate that are closer to the outlet portion are arranged to be perpendicular to the outlet axis and/or the transition axis.

3. The piping assembly according to claim 1, wherein the second straightening portion and the first straightening portion are configured to be spaced apart from each other.

4. A piping assembly characterized in that it comprises:

an inlet portion extending along an inlet axis;

an outlet portion extending along an outlet axis, wherein a predetermined angle is formed between the inlet axis and the outlet axis;

a transition portion being attached between the inlet portion and the outlet portion and defining a transition axis;

a cavity extending from the inlet portion to the outlet portion through the transition portion; and a first straightening portion comprising a plurality of deflector plates attached to an inner wall of the cavity, wherein the first straightening portion comprises at least a first deflector plate and a second deflector plate connected at an angle, the first deflector plate and the second deflector plate are configured to extend in parallel with a part of the outlet axis and a part of the transition axis;

a second straightening portion being arranged upstream and/or downstream of the first straightening portion, and the second straightening portion comprises a plurality of third deflector plates attached to the inner wall of the cavity;

wherein both ends of each of the third deflector plates are respectively attached to the inner wall of the cavity.

5. The piping assembly according to claim 1, wherein the third deflector plates are configured to be parallel with each other and extend in parallel with a part of the transition axis.

6. A piping assembly characterized in that it comprises:

an inlet portion extending along an inlet axis;

an outlet portion extending along an outlet axis, wherein a predetermined angle is formed between the inlet axis and the outlet axis;

a transition portion being attached between the inlet portion and the outlet portion and defining a transition axis;

a cavity extending from the inlet portion to the outlet portion through the transition portion; and a first straightening portion comprising a plurality of deflector plates attached to an inner wall of the cavity, wherein the first straightening portion comprises at least a first deflector plate and a second deflector plate connected at an angle, the first deflector plate and the second deflector plate are configured to extend in parallel with a part of the outlet axis and a part of the transition axis;

a second straightening portion being arranged upstream and/or downstream of the first straightening portion, and the second straightening portion comprises a plurality of third deflector plates attached to the inner wall of the cavity;

wherein a rear edge of each of the third deflector plates that is closer to the outlet portion is arranged to be perpendicular to the transition axis and/or the outlet axis.

7. A piping assembly characterized in that it comprises:

an inlet portion extending along an inlet axis;

an outlet portion extending along an outlet axis, wherein a predetermined angle is formed between the inlet axis and the outlet axis;

a transition portion being attached between the inlet portion and the outlet portion and defining a transition axis;

a cavity extending from the inlet portion to the outlet portion through the transition portion; and a first straightening portion comprising a plurality of deflector plates attached to an inner wall of the cavity, wherein the first straightening portion comprises at least a first deflector plate and a second deflector plate connected at an angle, the first deflector plate and the second deflector plate are configured to extend in parallel with a part of the outlet axis and a part of the transition axis;

a second straightening portion being arranged upstream and/or downstream of the first straightening portion, and the second straightening portion comprises a plurality of third deflector plates attached to the inner wall of the cavity;

wherein the first straightening portion is made of a porous material, and the second straightening portion is made of a porous material.

8. The piping assembly according to claim 1, wherein the predetermined angle is configured to be between 45 degrees and 135 degrees.

9. A refrigeration system characterized in that it comprises:

a refrigeration circuit comprising an evaporator and a compressor; and the piping assembly according to claim 1, wherein the inlet portion is attached to an outlet end of the evaporator, and the outlet portion is attached to an inlet end of the compressor.

10. The refrigeration system according to claim 9, wherein the piping assembly is arranged such that the inlet axis is oriented substantially vertical and the outlet axis is oriented substantially horizontal.

11. A piping assembly comprising:

an inlet portion extending along an inlet axis;

an outlet portion extending along an outlet axis, wherein a predetermined angle is formed between the inlet axis and the outlet axis;

a transition portion being attached between the inlet portion and the outlet portion and defining a transition axis;

a cavity extending from the inlet portion to the outlet portion through the transition portion; and a first straightening portion comprising a plurality of deflector plates attached to an inner wall of the cavity, wherein the first straightening portion comprises at least a first deflector plate and a second deflector plate connected at an angle, the first deflector plate and the second deflector plate are configured to extend in parallel with a part of the outlet axis and a part of the transition axis;

wherein the first straightening portion is made of a porous material.

* * * * *